United States Patent Office 2,980,634
Patented Apr. 18, 1961

2,980,634

QUATERNARY AMMONIUM COMPOUNDS OF POLYMERS OF AMINOALKYL VINYL ETHERS

Sidney Melamed, Philadelphia, Pa., assignor to Rohm & Haas Company, Philadelphia, Pa., a corporation of Delaware No Drawing. Filed Oct. 8, 1954, Ser. No. 461,285

12 Claims. (Cl. 260—2.1)

This invention relates to new and improved polymeric quaternary ammonium compounds and it is particularly concerned with quaternary ammonium compounds of polymers of aminoalkyl vinyl ethers which have special advantages as will be pointed out more particularly hereinafter as fungicides and bactericides.

The new compounds of the invention are polymers of monoethylenically unsaturated monomers comprising at least 20 mole percent of monomeric units of Formula I I
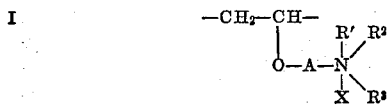

in which A is ethylene, trimethylene, or —CHR—CH$_2$— where R may be any alkyl or alkenyl group having from 1 to 16 carbon atoms, R' and R$^2$ may be (1) separate group selected individually from the group consisting of alkyl or alkenyl groups having 1 to 12 carbon atoms, hydroxyalkyl groups having 2 to 12 carbon atoms, alkoxyalkyl groups having 2 to 12 carbon atoms, (poly-alkoxy)alkyl groups having 2 to 12 carbon atoms, or (2) R' and R$^2$ may together represent the morpholino residue :(C$_2$H$_4$)$_2$:O, the pyrrolidino residue, —C$_4$H$_8$—, the piperidino residue, —C$_5$H$_{10}$—, and an N-alkyl-piperazino residue :(C$_2$H$_4$)$_2$:NR° where R° is an alkyl of 1 to 18 carbon atoms, such as methyl, ethyl, isopropyl, R$^3$ is selected from saturated and ethylenically unsaturated aliphatic hydrocarbon groups having 1 to 18 carbon atoms, (polyalkoxy)alkyl groups having 2 to 18 carbon atoms, alkoxyalkyl groups having 2 to 18 carbon atoms, hydroxyalkyl groups having 2 to 18 carbon atoms, an aralkyl or substituted aralkyl group having 7 to 24 carbon atoms, or a phenoxyalkyl group having 7 to 24 carbon atoms, at least one of R', R$^2$, and R$^3$ has at least 7 carbon atoms, and X is OH or a negative, salt-forming atom or radical, preferably of monovalent character, such as halide, e.g., bromide, chloride, iodide, sulfate, e.g., the methyl sulfate anion, and sulfonate, e.g., p-toluene- or cyclohexyl-sulfonate anions.

Preferred compounds are those in which A is ethylene, R' and R$^2$ are methyl or ethyl and R$^3$ is an alkyl, aralkyl, or alkenyl group having 7 to 20 carbon atoms.

The new compounds may be made by polymerizing an amine having the structure of Formula II

II    CH$_2$=CHOANR'R$^2$ and subsequently quaternizing the polymer. Alternatively, a monomer having the structure of Formula II above may be quaternized and the quaternary compound then polymerized.

For producing the compounds in accordance with the first method, the monomer of the structure of Formula II may be mixed with an acyclic azo catalyst or initiator either in the presence or absence of an inert solvent and heating the mixture at temperatures of 60° to 100° C. until the desired extent of polymerization is attained. Typical azo catalyst are azodiisobutyronitrile, azodiisobutyramide, dimethyl (or diethyl or dibutyl) azodiisobutyrate, azobis-(α,γ - dimethylvaleronitrile), azobis(α - methylbutyronitrile), azobis(α-methylvaleronitrile), dimethyl azobis-methylvalerate, and the like. When the monomer is water-soluble, water may serve as the solvent, if desired. Other solvents that may be used include methanol, ethanol, isobutanol, butanol, benzene, toluene, dimethyl-formamide and so on. The amount of catalyst may be from 0.1% to about 20% by weight of the monomer. Preferably polymerization is carried out in an inert atmosphere, such as nitrogen. When the monomer or monomers having the structure of Formula II is or are to be copolymerized with other polymerizable olefinically unsaturated compounds, the copolymerization may be effected in the presence of an initiator or catalyst of the free radical type, such as the azo catalysts mentioned above, or peroxides, such as butyl perbenzoate or benzoyl peroxide. With an azo catalyst temperatures between 50° and about 100° C. are generally effective for copolymerizing. Somewhat higher temperatures are useful when catalysts of the peroxidic type are used, temperatures between 75° and 150° C. being practical, the above temperatures being those observed for copolymerization in bulk or in solution. Temperatures between 0° and 100° C. or more are useful when copolymerization is carried out in aqueous suspensions or in emulsions using monomeric emulsifiers, such as octylphenoxypolyethoxyethanol.

The same azo catalysts described above for use in forming polymers are used for preparing copolymers, particularly when the major portion of the monomers is a vinyl ether of the invention. The amount of catalyst may be varied between 0.1% and 5% of the weight of the monomers to be copolymerized. A range of 0.3% to 1% is preferred, at least at the start. Small amounts of catalyst may be added from time to time as copolymerization proceeds.

When a vinyl ether of the invention furnishes the minor portion of an interpolymer, however, other free radical catalysts may prove desirable. For example, organic peroxides such as butyl perbenzoate, or benzoyl peroxide, are suitable for polymerization in bulk or in solution, while ammonium persulfate and the like are useful in the polymerization of dispersions.

When the monomers are quaternized before polymerization, the polymerization may be effected under essentially the same conditions as outlined for the polymerization of the monomers of Formula II, or in the case of copolymerization, under the same conditions as are prescribed above for the copolymerization of the compounds above with other monoethylenically unsaturated compounds.

Monomers of the structure of Formula II or polymers or copolymers thereof may be quaternized with any suitable alkylating agent (which is herein intended to include aralkylating agents and substituted aralkylating agents), such as methyl chloride, ethyl chloride, benzyl chloride, allyl chloride, substituted allyl chlorine, e.g., dodecylallyl chloride, dodecenyl chlorides, alkylbenzyl chlorides, e.g., octylbenzyl chlorides (from diisobutylene), any chloromethylated aromatic-like compound, e.g., chlorobenzyl chloride, chloromethylated thiophene, chloromethylated furane, chloromethylated naphthalene, or corresponding bromides or iodides, e.g., phenoxyethyl bromide, methyl iodide; dimethyl sulfate, dimethyl sulfite, dimethyl phosphite, ethylene oxide, propylene oxide, styrene oxide, and butylene oxide. The quaternization is preferably effected in a polar solvent, such as water, ethanol, acetonitrile or glycol ethers or mixtures of one of these solvents with benzene or toluene, at a temperature of 40° to 100° C. in a period of time of about two to twelve hours.

Examples of monomers of other types that may be copolymerized with one or more of the tert-aminoalkyl vinyl ethers of Formula II include the vinyl aromatic compounds, more particularly the vinyl aromatic hydrocarbons (e.g., styrene, isopropenyl toluene, the various dialkyl styrenes, etc.), other aliphatic compounds containing a $CH_2=C<$ grouping, e.g., acrylonitrile and the various substituted acrylonitriles (e.g., methacrylonitrile, ethacrylonitrile, phenylacrylonitrile, etc.), acrylamide and the various substituted acrylamides (e.g., methacrylamide, ethacrylamide, N-substituted acrylamides and the various N-substituted alkacrylamides, for instance N-methylol acrylamide, N-monoalkyl and -dialkyl acrylamides and methacrylamides, e.g., N-monomethyl, -ethyl, -propyl, butyl, etc. and N-dimethyl, -ethyl, -propyl, -butyl, etc., acrylamides and methacrylamides, N-monoaryl and -diaryl acrylamides and alkacrylamides, e.g., N-monophenyl and -diphenyl acrylamides and methacrylamides, etc.), the vinyl esters, e.g., vinyl acetate, vinyl propionate, vinyl butyrate, vinyl isobutyrate, vinyl valerate, etc., esters of an acrylic acid (including acrylic acid itself and the various alpha-substituted acrylic acids, e.g., methacrylic acid, ethacrylic acid, phenylacrylic acid, etc., the most common of which, namely acrylic acid and methacrylic acid, may be represented by the general formula

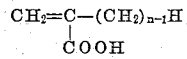

in which $n$ is an integer having a value of 1 to), more particularly the alkyl esters of an acrylic acid, e.g., the ethyl, propyl, isopropyl, n-butyl, isobutyl, sec.-butyl, tert-butyl, amyl, hexyl, heptyl, octyl, decyl, dodecyl, etc. esters of acrylic, methacrylic, ethacrylic, phenylacrylic, etc. acids obtained by reaction of one of these acids with an alcohol, vinyl ethers, such as butyl vinyl ether, N-vinyl compounds such as N-vinyl pyrrolidone, and olefins, such as ethylene, fluorinated vinyl compounds, such as vinylidene fluoride, other vinyl ethers, such as methyl vinyl ether, aminoethyl vinyl ether, aminoisobutyl vinyl ether, amidoalkyl vinyl ethers such as amidoethyl vinyl ether, N-dimethyl- or N-methyl- amidoethyl vinyl ether, and ureidoalkyl vinyl ethers, e.g., ureidoethyl vinyl ether, and of the other ureidoalkyl vinyl ethers mentioned in U.S. Patent 2,689,844, September 21, 1954.

The new quaternary ammonium compounds are solid, resinous products of colorless to yellowish or tan appearance, and they are quite stable to ultraviolet light. The homopolymers generally have an average molecular weight of about 1,000 to 2,000 or more, whereas copolymers with the monomers mentioned above generally may have higher average molecular weights of 10,000 to 50,000 or more.

The properties of the copolymers depend upon the character of the quaternary ammonium groups and also on the properties and character of any other comonomer or comonomers present in the polymer. Variations in solubility are obtainable; however, because of the fact that at least one of $R'$, $R^2$ and $R^3$ is of at least 7 carbon atoms in size, the polymers have a limited solubility in water which apparently accounts for the tenacity of the compounds to foliage when used as fungicides. By increasing the molecular size of the radicals, A, $R'$, $R^2$ and $R^3$, a point is reached wherein oil-solubility is imparted rendering such polymers valuable as oil additives to improve the lubricating value. The use of monomers having large-sized hydrocarbon groups also enhances oil-solubility.

The polymers are useful for many purposes. Thus, they serve as bactericides, fungicides; antistatic agents for treatment of hydrophobic plastic materials such as cellulose esters, cellulose acetate, vinyl resins, nylon, polyethylene terephthalate, etc. in form of fibers, filaments, films, yarns, fabrics; for absorption of acid ions from liquids, such as oils or aqueous solutions; as flocculating and aggregating agents, dispersants, softening agents for cellulosic textiles or films, especially rayon, cellulose acetate, and cotton; as modifying components of film-forming materials, to improve the dyeing of fibers, filaments, films, textiles, and other shaped articles, formed therefrom, particularly of cellulose acetate and acrylonitrile polymers containing at least 75% acrylonitrile in the polymer molecule, especially when a common solvent, such as acetone, dimethylformamide or dimethylacetamide, is used to prepare a spinning or extrusion dope containing the film-forming polymer and the dye-modifying polymer; as anchoring agents for asbestos and cellulosic fibers, especially for addition to paper pulp or cellulosic pulps on which they are selectively absorbed and to which they are adapted to anchor acidic materials, such as copolymers of acrylic or methacrylic acid with other vinyl monomers as is described in McLaughlin, Serial No. 410,450, filed February 15, 1954, now United States Patent 2,765,229; as a pharmaceutical, especially for fungicidal and bactericidal purposes; also to isolate protein fractions by forming an insoluble complex and regenerating the protein.

When added to acetone solutions of cellulose acetate in amounts of 2 to 10% by weight of the cellulose acetate, the fibers, filaments and the like obtained by the spinning of such solutions may be dyed and show improved resistance to gas-fading as a result of the incorporation of the quaternary ammonium compounds. For improving the dye-receptivity of such polymers as those of acrylonitrile, about 3 to 10% of the quaternary ammonium compound, on the weight of the polymer, is generally adequate to provide for deep dyeing with acid dyes. The polymers or copolymers are substantive to wool and advantageous for shrink-proofing wool fabrics or felts. The treatment of wool may involve the preparation by emulsion polymerization of a polymer of 50 to 80% by weight of an acrylic ester, such as butyl acrylate, with 50 to 20% by weight of a quaternary of an amine of Formula II and the application of the resulting copolymer in an amount of 5 to 10% on the weight of the fabric and subsequent drying thereon. Alternatively, a polymer or copolymer of an amine of Formula II may be partially quaternized and applied to the felt or fabric and then insolubilized in situ by completing the quaternization with ethylene dibromide or xylene dichloride. This may be accompanied by heating the dried treated fabric at 80° to 100° C. for about five to ten minutes.

To produce permselective-ion-exchange membranes, a quaternary ammonium polymer of the invention may be introduced into a cellulose acetate-acetone dope or into an aqueous solution of a water-soluble film former, such as polyvinyl alcohol, and the solutions thereby obtained may be coagulated in the form of films or membranes of the desired thickness and then insolubilized where necessary as by the use of formaldehyde as in the case of polyvinyl alcohol.

The quaternary ammonium compounds obtained in accordance with the invention in which one of $R'$, $R^2$ and $R^3$ is benzyl or substituted benzyl, such as methylbenzyl or phenoxyethyl, are valuable antiviral and antibiotic agents and for this general purpose provide valuable additions or supplements to animal foods, such as for chickens, ducks and so forth.

As compared to quaternary ammonium alkyl esters, the quaternary ammonium alkyl ethers of the present invention are far more stable to ultraviolet light and, therefore, maintain their virility as fungicides in the field in sunlight. They are also resistant to hydrolysis under all conditions of storage, even in high humidity. The quaternary compounds of the present invention are non-phytotoxic and maintain their fungicidal and bactericidal action in hard water and even in the presence of horse serum. Their ability to maintain their toxicity under such conditions is quite unusual in that previously known quaternary ammonium compounds generally show greatly diminished activities in hard water and in the presence of horse serum.

The following examples are illustrative of the invention:

Example 1

(a) One hundred grams of dimethylaminoethyl vinyl ether and 15 g. of dimethyl azodiisobutyrate are mixed and heated at 75° C. for 24 hours. Residual monomeric amine is removed by heating the mixture at 100° C. at 0.2 to 0.5 mm. for 24 hours. Polymer remains as a yellow viscous oil (60 g.). The ebulliometric molecular weight is about 1,350.

(b) A solution in 150 ml. of absolute ethanol of 24.2 g. of the polymer produced in part (a) is treated with 26.6 g. of benzyl chloride and refluxed for 5 hours. Then the reaction mixture is stripped to dryness at 60° C. Residual solid is washed with benzene and dried to give 47 g. of light tan powder. It contains 5.0% N and 13.1% Cl. This corresponds to poly-(benzyldimethylammoniumethyl vinyl ether chloride). The polymer is readily soluble in methanol and water and is insoluble in petroleum ether and benzene.

This polymer shows a typical curare-like action when administered to rabbits with duration equal to d-tubocurarine. It also serves as an efficient bactericide and fungicide, giving complete inhibition of *Candida albicans, Escherichia coli,* Mycobacterium sp. 607, *Micrococcus pyogenes* var. *aureus,* or *Trichophyton rubrum* at concentrations of less than 1 part per thousand and in many cases at a concentration of less than ten parts per million. It maintains its effectiveness in this respect even in hard water and even when the culture broth contains 10% of horse serum. This polymer is non-phytotoxic to tomatoes even when applied at 1% whereas the monomeric benzyldimethylammoniumethyl vinyl ether chloride also has fungicidal and bactericidal activity but is severely phytotoxic to tomatoes even when applied at 0.01% concentration.

It is also a viricidal agent and a parasiticide. It is, therefore, useful as a diet supplement for livestock, such as chickens.

(c) The procedure of part (b) hereof is carried out with 45 g. of phenoxyethyl bromide instead of the benzyl chloride. The solid product obtained shows bactericidal and fungicidal properties approximately equivalent to the quaternary of part (b).

Example 2

A solution of 11.5 g. of the polymer of Example 1(a) in 150 ml. anhydrous ethanol is treated with 22.6 g. of $\Delta^{2,3}$-dodecenyl chloride (which is also properly designated 2-dodecenyl chloride) and heated at 80° C. for 6½ hours. Titration for halogen indicates over 90% conversion to quaternary. The solution is concentrated and purified by redissolving in benzene, and precipitating with petroleum ether. It contains 4.2% N and 10.7% ionizable halogen. It is essentially insoluble in water, but is soluble in methanol, acetone, or mixtures of either of these solvents with water.

This polymer is an effective bactericide. It shows a 22 mm. zone of inhibition when tested against *Micrococcus pyogenes* var. *aureus.* It has a phenol coefficient of 24 against *S. typhosa* and 86 against *Micrococcus pyogenes* var. *aureus.*

This polymer has an $LD_{50}$ of less than 50 parts per million against *Stemphylium sarcinaeforme* and less than 10 p.p.m. against *Monilinia fructicola.* It shows no injury to tomato plants even when applied at a 1% level of concentration. It has excellent tenacity both in field trials and when tested by the conventional glass slide test procedure (retaining 79% of its activity after the test).

The corresponding monomeric quaternary dimethyl-dodecenylvinoxyethylammonium chloride) has substantially the same effectiveness as the polymer against the two fungi mentioned but has no tenacity when tested by the glass slide procedure and shows severe injury to tomato plants even when applied at a concentration as low as 0.1%.

Example 3

In 100 ml. of absolute ethanol, 13.6 g. of the polymer of Example 1(a) are dissolved and then 28.2 g. of caprylbenzyl chloride are added. The mixture is refluxed for 3 hours and then solvent is stripped off. The residue is washed with petroleum ether and dried to give 27.6 g. of a tan solid not appreciably soluble in water but soluble in benzene, acetone and butoxyethanol. It contained 3.7% N and 9.3% of ionic chlorine.

The polymer has an $LD_{50}$ against *Stemphylium sarcinaeforme* of less than 50 p.p.m. and against *Monilinia fructicola* of less than 5 p.p.m. It has good tenacity and no phytotoxicity on tomatoes at 1% or on apples or peaches at 1½ pounds per 100 gallons.

The polymer is an efficient bactericide giving a zone of inhibition of 22 mm. against *Micrococcus pyogenes* var. *aureus* and having a phenol coefficient against this bacterium of 14 and against *S. typhosa* of 44. It maintains this activity in hard water.

Example 4

11.5 g. of the polymer of Example 1(a), 28 g. of chloromethyldodecyltoluene, and 150 ml. of absolute ethanol are heated at 80° C. for 4½ hours. Titration for halogen shows more than 90% quaternization. Solvent is stripped off and the residue is redissolved in benzene, precipitated with petroleum ether and then dried to give a light yellow solid containing 3.5% N and 8.9% titratable halogen. The product is only slightly soluble in water, but soluble in toluene, or aqueous alcohol.

The product gives 100% kill of both *Stemphylium sarcinaeforme* and *Monilinia fructicola* at 0.01% concentration. It is non-phytotoxic to tomato plants even at 1% concentration. It has a phenol coefficient of 25 against both *S. typhosa* and *Micrococcus pyogenes* var. *aureus.* The bactericidal activity is maintained without appreciable reduction in effectiveness in hard water.

Example 5

A polymer of dimethylaminopropyl vinyl ether was produced by the procedure of of Example 1(a) and was quaternized with phenoxyethyl bromide by the procedure of Example 1(b) in which the aforesaid bromide replaced the benzyl chloride. The resulting quaternary ammonium polymer is added to chick feed in a very small amount to improve the health and growth of the chicks.

Example 6

A copolymer of 20 mole percent dibutylaminoethyl vinyl ether with 80 mole percent of vinyl acetate obtained by the procedure of Example 1(a) is quaternized as in Example 1(b) with octyloxybutyl chloride. The resulting quaternary polymer softens rayon and cotton fabrics.

Example 7

The procedure of Example 1(a) is followed except that the vinyl ether was replaced with 50 mole percent of dioctylaminoethyl vinyl ether and 50 mole percent of methyl acrylate. The resulting copolymer is quaternized by the procedure of Example 1(b) with dimethyl sulfate. The polymeric quaternary compound obtained serves as an antistatic agent for hydrophobic yarns and especially nylon and copolymers of about 80 to 90% of vinyl chloride with the balance of vinyl acetate.

Example 8

A copolymer of 75 mole percent of didodecylaminoethyl vinyl ether with 25 mole percent of vinyl chloride obtained by the procedure of Example 1(a) is quaternized as in Example 1(b) with benzyl chloride. The resulting polymer serves as an anti-static agent for hydrophobic yarns and especially nylon and copolymers of about 80 to 90% of vinyl chloride with the balance of vinyl acetate.

*Example 9*

By the procedure of Example 1(a) 2-dicyclohexylamino-1-benzylethyl vinyl ether is polymerized and it is then quaternized by the procedure of Example 1(b) except that the benzyl chloride is replaced with octadecyl chloride. The polymeric quaternary compound obtained, when applied to textile fabrics, imparts a soft hand and water-repellence thereto.

*Example 10*

By the procedure of Example 1(a) 2-dimethylamino-1-octadecylethyl vinyl ether is polymerized and the polymer obtained is then quaternized as in Example 1(b). The resulting compound is a polymeric quaternary having valuable fungicidal and bactericidal properties.

*Example 11*

(a) By the procedure of Example 1(a) 2-morpholinoethyl vinyl ether is polymerized, and the polymer obtained is then quaternized with dodecyl-benzyl chloride as in Example 1(b). The resulting polymeric compound is a fungicide and bactericide.

(b) The procedure of part (a) hereof is repeated substituting entirely for the dodecylbenzyl chloride octadecylbenzyl chloride at equivalent molar concentration.

*Example 12*

(a) By the procedure of Example 1(a), 2-(di(2-hydroxyethyl)amino)ethyl vinyl ether is polymerized and the polymer thus obtained is quaternized with p-chlorobenzyl chloride as in Example 1(b). The resulting polymeric compound is useful as a bactericidal-fungicide particularly in hard water.

(b) By the procedure of Example 1(a), 2-(di(butoxyethyl)amino)ethyl vinyl ether is polymerized and the polymer thus obtained is quaternized with 1,2-epoxydodecane as in Example 1(b). The resulting polymeric compound is a strong base useful as a bactericide. Separate portions of the polymer are readily converted to a number of essentially neutral or weakly basic salts by addition of hydrochloric, hydrobromic, hydroiodic, sulfuric, phosphoric, sulfurous, lactic, acetic, trichloroacetic, trifluoroacetic, and fluorosilicic acids, respectively.

(c) The amine of part (b) above is entirely substituted by an equivalent molar quantity of each of the following amines: 2-(di(methoxyethyl)amino)ethyl vinyl ether, 2-(di(ethoxyethyl)amino)ethyl vinyl ether, 2-(di(ethoxyethoxyethyl)amino)-ethyl vinyl ether and 2-(di(lauroxyethyl)amino)ethyl vinyl ether and the procedure is repeated with each of these amines.

(d) The procedure of part (b) is repeated except the epoxide thereof is entirely replaced with 1,2-epoxyoctadecane.

*Example 13*

(a) The polymer of Example 1(a) is alkylated by the procedure of Example 1(b) with an equimolar amount of octadecylphenoxyethyl bromide to give poly-(octadecylphenoxyethyl dimethylammonium ethyl vinyl ether chloride).

(b) The procedure of part (a) hereof is repeated except that the bromide is entirely replaced by dodecylphenoxyethyl bromide and in a second run by an equivalent molar amount of hexadecylphenoxyethyl bromide. In each case the corresponding quaternary is obtained in good yield.

*Example 14*

(a) A polymer is prepared by the method of Example 1(a) from N-vinyloxyethyl-N'-methylpiperazine,

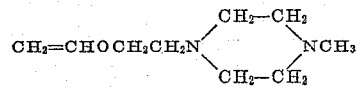

The resultant polymer is alkylated with one equivalent of 2,4-dichlorobenzyl chloride to give a mixture of products consisting largely of the polymer having monoquaternary units. A second sample of the polymer is alkylated with two equivalents of the 2,4-dichlorobenzyl chloride to give a polymer having diquaternary units of the formula

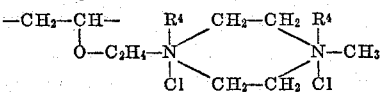

where $R^4$ is 2,4-dichlorobenzyl.

(b) A polymer is prepared from N-vinyloxyethyl-N'-octadecylpiperazine as in part (a). A series of quaternary hydroxides are prepared by reaction of portions of the polymer with two equivalents each of ethylene oxide, propylene oxide, and styrene oxide. These diquaternary hydroxides are each converted to neutral salts with hydrochloric acid.

*Example 15*

(a) Dimethylaminoethyl vinyl ether, 48.3 g., and benzyl chloride, 50.6 g., are dissolved in 400 ml. of absolute ethanol and heated to reflux for 3 hours. Titration with silver nitrate indicated essentially complete alkylation. The alcohol is removed by stripping at reduced pressure to give 101 g. of solid, hydroscopic product. The theoretical yield is 97 g. The product is recrystallized from a mixture of methanol and ethyl acetate to give a white, crystalline solid corresponding to vinyloxyethyldimethylbenzylammonium chloride.

This low molecular weight monomeric material is an active fungicidal agent but injures tomato foliage when applied at a concentration of 0.01%.

(b) A mixture of 18.1 g. (0.075 mole) of the product of part (a) hereof, 5.4 g. (0.08 mole) of acrylamide, 23.5 g. of water and 0.6% by weight of dimethyl azodiisobutyrate is heated at 75° for sixteen hours in an inert atmosphere. Precipitation with acetone gives 17.8 g. of solid copolymer containing 9.9% nitrogen. The calculated value for a 1:1 copolymer is 9.0% nitrogen while that for the quaternary alone is 5.8%. The product which is readily water-soluble precipitated solutions of polycarboxylic and of polysulfonic acids and gave a strong, positive test for chloride ion and is thus a copolymer of the two monomers. The product is a useful fungicidal agent and is non-phytotoxic to tomato plants at 1%.

(c) A similar copolymer is prepared from an equimolar mixture of the product of part (a) hereof and methacrylamide. The copolymer is obtained in a conversion of 60% and 8.4% nitrogen corresponding closely to the value of 8.7% calculated for a 1:1 copolymer.

(d) Copolymers are similarly prepared from the quaternary of part (a) hereof and either methyl acrylate or butyl acrylate.

*Example 16*

(a) By the procedure of Example 15(a) but with replacement of the benzyl chloride entirely with caprylbenzyl chloride there is prepared vinyloxyethyldimethyl caprylbenzylammonium chloride. This material is an excellent fungicide but is phytotoxic when tested on tomato plants. In place of the caprylbenzyl chloride there is substituted dodecenyl chloride or methyldodecylbenzyl chloride. In each case, the corresponding quaternary is readily obtained and isolated. These materials are fungitoxic but phytocidal.

(b) Copolymers are prepared as in Example 15(b) except that no solvent is used and the acrylamide is replaced by 0.08 mole of methyl methacrylate and of butyl methacrylate, respectively. The products are non-phytotoxic fungicides.

Example 17

(a) A polymer is prepared from di-(2-ethylhexyl)aminoethyl vinyl ether by the procedure of Example 1(a) and then converted to the polyquaternary with an equivalent amount of allyl chloride by the procedure of Example 1(b). The product is an effective fungicide.

(b) The polymer of Example 5 is alkylated with delta-9-10-octadecenyl bromide to give the corresponding polyquaternary. This material is an effective fungicidal bactericide.

(c) Polymers are prepared from each of the following amines by the procedure of Example 1(a): 2-dimethylamino-1-cyclohexenylethyl vinyl ether, 2-dimethylamino-1-vinylethyl vinyl ether.

(d) Each of the polymers of part (c) are separately converted to a poly-quaternary by reaction with 4-methylbenzyl chloride.

It is to be understood that changes and variations may be made without departing from the spirit and scope of the invention as defined in the appended claims.

I claim:

1. A resinous linear addition polymer of about 20 to 100 mole percent of polymerized units having the formula

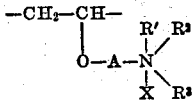

in which A is selected from the group consisting of ethylene, trimethylene and —CHR-CH$_2$—, R being selected from the group consisting of alkyl and alkenyl groups having 1 to 16 carbon atoms, R' and R$^2$ are selected individually from the group consisting of alkyl groups having 1 to 12 carbon atoms, R$^3$ is selected from the group consisting of ethylenically unsaturated aliphatic hydrocarbon groups having 3 to 18 carbon atoms, and alkylbenzyl and alkenylbenzyl groups having up to 24 carbon atoms, at least one of R', R$^2$, and R$^3$ having at least 7 carbon atoms, and X is selected from the group consisting of OH and negative, salt-forming atoms and radicals, and 0 to 80 mole percent of at least one other monoethylenically unsaturated compound copolymerizable therewith.

2. As a composition of matter, a resinous linear addition copolymer of (1) amino molecules of the formula

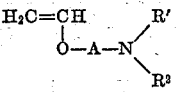

in which A is an alkylene group having 2 to 18 carbon atoms of which at least two extend in a chain between the O and N atoms, R' is an alkyl group having 1 to 12 carbon atoms, and R$^2$ is an alkyl group having 1 to 12 carbon atoms, (2) at least 20 mole percent of units containing quaternary nitrogen groups and derived from the polymerized units obtained from the aforementioned amino molecules by alkylation thereof, said quaternary nitrogen containing units having the formula

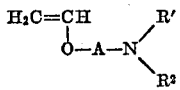

in which A, R' and R$^2$ are as defined hereinbefore,

R$^3$ is an ethylenically unsaturated hydrocarbon group having 3 to 18 carbon atoms, X is an anion, and at least one of R', R$^2$, and R$^3$ has at least 7 carbon atoms, and (3) at least one other monoethylenically unsaturated compound copolymerizable therewith an amount from 0 mole percent up, the amount of (3) being sufficient to make the total of (1), (2), and (3) in the copolymer equal to 100 mole percent.

3. As a composition of matter, a resinous linear addition copolymer of (1) amino molecules of the formula

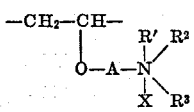

in which A is an alkylene group having 2 to 18 carbon atoms of which at least two extend in a chain between the O and N atoms, R' is an alkyl group having 1 to 12 carbon atoms, and R$^2$ is an alkyl group having 1 to 12 carbon atoms, (2) at least 20 mole percent of units containing quaternary nitrogen groups and derived from the polymerized units obtained from the aforementioned amino molecules by alkylation thereof, said quaternary nitrogen containing units having the formula

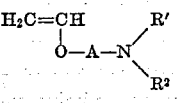

in which A, R' and R$^2$ are as defined hereinbefore,

R$^3$ is an alkyl-substituted aralkyl group having 7 to 24 carbon atoms, and

X is an anion, and (3) at least one other monoethylenically unsaturated compound copolymerizable therewith in an amount from 0 mole percent up, the amount of (3) being sufficient to make the total of (1), (2), and (3) in the copolymer equal to 100 mole percent.

4. As a composition of matter, a resinous linear addition copolymer of (1) amino molecules of the formula

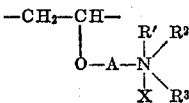

in which A is an alkylene group having 2 to 18 carbon atoms of which at least two extend in a chain between the O and N atoms, R' is an alkyl group having 1 to 12 carbon atoms, and R$^2$ is an alkyl group having 1 to 12 carbon atoms, (2) at least 20 mole percent of units containing quaternary nitrogen groups and derived from the polymerized units obtained from the aforementioned amino molecules by alkylation thereof, said quaternary nitrogen containing units having the formula

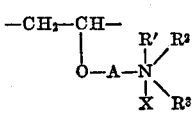

in which A, R' and R$^2$ are as defined hereinbefore,

R$^3$ is an alkenyl-substituted aralkyl group having 7 to 24 carbon atoms, and

X is an anion, and (3) at least one other monoethylenically unsaturated compound copolymerized therewith in an amount from 0 mole percent up, the amount of (3) being sufficient to make the total of (1), (2), and (3) in the copolymer equal to 100 mole percent.

5. As a composition of matter, a resinous linear addition polymer of about 20 to 100 mole percent of units of the formula

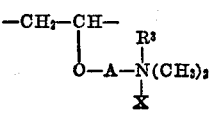

wherein A is an alkylene group having 2 to 18 carbon atoms of which at least two extend in a chain between the O and N atoms, $R_3$ is an alkenyl group having 7 to 20 carbon atoms, and X is an anion, and 0 to 80 mole percent of at least one other monoethylenically unsaturated compound copolymerizable therewith.

6. As a composition of matter, a resinous linear addition polymer of about 20 to 100 mole percent of units of the formula

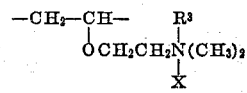

wherein $R^3$ is 2-dodecenyl and X is an anion,
and 0 to 80 mole percent of at least one other monoethylenically unsaturated compound copolymerizable therewith.

7. As a composition of matter, a resinous linear addition polymer of about 20 to 100 mole percent of units of the formula

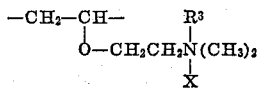

wherein $R^3$ is an alkenyl group having 7 to 20 carbon atoms, and

X is an anion, and 0 to 80 mole percent of at least one other monoethylenically unsaturated compound copolymerizable therewith.

8. As a composition of matter, a resinous linear addition polymer of about 20 to 100 mole percent of units of the formula

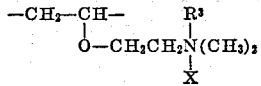

wherein $R^3$ is a substituted benzyl group having up to 24 carbon atoms, said group being substituted by at least one alkyl group, and X is an anion, and 0 to 80 mole percent of at least one other monoethylenically unsaturated compound copolymerizable therewith.

9. As a composition of matter, a resinous linear addition polymer of about 20 to 100 mole percent of units of the formula

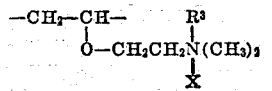

wherein $R^3$ is a substituted benzyl group having up to 24 carbon atoms, said group being substituted by at least one alkenyl group, and X is an anion, and 0 to 80 mole percent of at least one other monoethylenically unsaturated compound copolymerizable therewith.

10. As a composition of matter, a resinous linear addition polymer of about 20 to 100 mole percent of (caprylbenzyl)dimethyl($\beta$ - vinyloxyethyl)ammonium chloride and 0 to 80 mole percent of at least one other monoethylenically unsaturated compound copolymerizable therewith.

11. As a composition of matter, a resinous linear additional polymer of about 20 to 100 mole percent of (dodecyltolylmethyl)dimethyl($\beta$ - vinyloxyethyl)ammonium chloride and 0 to 80 mole percent of at least one other monoethylenically unsaturated compound copolymerizable therewith.

12. As a composition of matter, a resinous linear addition polymer of about 20 to 100 mole percent of (octadecylphenoxyethyl)dimethyl($\beta$ - vinyloxyethyl)ammonium bromide and 0 to 80 mole percent of at least one other monoethylenically unsaturated compound copolymerizable therewith.

References Cited in the file of this patent
UNITED STATES PATENTS

| | | |
|---|---|---|
| 2,601,251 | Bruson | June 24, 1952 |
| 2,683,125 | D'Alelio | July 6, 1954 |
| 2,764,578 | Barney | Sept. 25, 1956 |
| 2,808,349 | Melamed | Oct. 1, 1957 |
| 2,884,057 | Wilson et al. | Apr. 28, 1959 |
| 2,897,200 | Maeder et al. | July 28, 1959 |

OTHER REFERENCES

Butler et al.: J. Amer. Chem. Soc., vol. 74, Apr. 20, 1952, pages 1939–1941.